United States Patent [19]

Heil et al.

[11] Patent Number: 5,327,540
[45] Date of Patent: Jul. 5, 1994

[54] METHOD AND APPARATUS FOR DECODING BUS MASTER ARBITRATION LEVELS TO OPTIMIZE MEMORY TRANSFERS

[75] Inventors: Thomas F. Heil; Daniel C. Robbins, both of Easley; Edward A. McDonald, Lexington, all of S.C.

[73] Assignee: NCR Corporation, Dayton, Ohio

[21] Appl. No.: 16,652

[22] Filed: Feb. 1, 1993

Related U.S. Application Data

[63] Continuation of Ser. No. 762,519, Sep. 18, 1991.

[51] Int. Cl.⁵ .......................................... G06F 13/362
[52] U.S. Cl. ................... 395/325; 395/250; 364/DIG. 1; 364/229.2; 364/240.5; 364/242.92; 364/259.9; 364/239.8
[58] Field of Search ........................ 395/250, 325, 725

[56] References Cited

U.S. PATENT DOCUMENTS

| | | | |
|---|---|---|---|
| 4,067,059 | 1/1978 | Derchak | 395/425 |
| 4,346,440 | 8/1982 | Kyn | 395/200 |
| 4,787,028 | 11/1988 | Finfrock | 395/325 |
| 4,864,532 | 9/1989 | Reeve et al. | 395/250 |
| 4,893,235 | 1/1990 | Butts, Jr. et al. | 364/200 |
| 4,947,319 | 8/1990 | Bozman | 364/200 |
| 4,972,338 | 11/1990 | Crawford et al. | 364/200 |
| 4,991,085 | 2/1991 | Pleva | 395/275 |
| 5,121,480 | 6/1992 | Bonke et al. | 395/250 |
| 5,133,062 | 7/1992 | Joshi et al. | 395/500 |
| 5,274,822 | 12/1993 | Stanton et al. | 395/725 |

Primary Examiner—Debra A. Chun
Attorney, Agent, or Firm—James M. Stover

[57] ABSTRACT

A buffer management scheme for optimally configuring a data buffer within a computer system which includes a plurality of bus masters connected through a Micro Channel bus and the data buffer to a shared resource, such as memory. The scheme decodes unique four-bit Micro Channel arbitration values assigned to the bus masters to retrieve buffer configuration parameters stored within a register file containing different configuration parameters for each bus master. The data buffer is dynamically configured for optimal performance with each bus master having control of the Micro Channel bus in accordance with the parameter data retrieved from the register file.

16 Claims, 4 Drawing Sheets

METHOD AND APPARATUS FOR DECODING BUS MASTER ARBITRATION LEVELS TO OPTIMIZE MEMORY TRANSFERS

This is a continuation of application Ser. No. 07/762,519, filed on Sep. 18, 1991.

The present invention relates to computer architectures including shared memory resources and, more particularly, to a memory buffer and buffer management technique for shared memory resources.

BACKGROUND OF THE INVENTION

NCR Corporation has developed a scalable computer system architecture providing more effective scaling of multiprocessor performance than conventional system architectures. The scalable system architecture recognizes and overcomes many limitations of conventional system architectures, such as degradation caused by multiple processors sharing memory and memory busses, and overhead penalties associated with memory/cache coherency.

Key characteristics of this new architecture include: the use of multiple memory busses to reduce memory bus utilization and physical loading; the use of multi-ported memory to facilitate multiple busses and allow simultaneous use of different memory devices; the use of memory base coherency techniques that significantly reduce coherency overhead; and a symmetric view of system resources by all processors.

One implementation of this architecture employing dual system busses (12 and 14) and two dual-ported memory modules (16 and 18) connected between the system busses is shown in FIG. 1. Also shown in FIG. 1 are two Micro Channel ® input/output (I/O) busses 32 and 42 and interface modules 28 and 30 connecting respective I/O busses 32 and 42 with the system busses. Thus, multiple bus masters, identified by reference numerals 34, 36, 38, 40, 44, 46 and 48 in FIG. 1, have access to memory modules 16 and 18. Arbitration systems may be employed to prioritize access to the system memory.

Each bus master which seeks read or write access with system memory may possess different memory transfer parameters for optimal operation. Memory caches and buffers can be employed to enhance memory transfer operations, but the wide variance in bandwidth requirements and performance characteristics among the bus masters makes it impossible to define a single buffer scheme that provides optimal performance for each bus master. For example, the Micro Channel bus architecture defines a high performance 80 Mbytes/second streaming transfer mode optimized for large block transfers. A bus master reading from memory using the streaming mode requires buffer logic which reads and buffers data from system memory relatively far ahead of the bus master. However, another bus master in the same system may only read a few bytes of information from the system memory every time it arbitrates for memory access. In this case, utilization of a buffering scheme which reads far ahead only to discard the bulk of prefetched data needlessly wastes system memory bandwidth.

OBJECTS OF THE INVENTION

It is therefore an object of the present invention to provide a new and useful buffering scheme.

It is another object of the present invention to provide buffer control logic which selects the optimal set of buffer parameters for bus master to memory transfers.

It is yet another object of the present invention to provide such buffer control logic which decodes bus master arbitration signals to select buffer parameters.

It is still a further object of the present invention to provide a new and useful memory buffer scheme which decodes arbitration signals associated with a plurality of Micro Channel ® bus masters to optimize data transfers between any selected bus master and a shared memory resource.

SUMMARY OF THE INVENTION

There is provided, in accordance with the present invention, a method and apparatus for optimally configuring a data buffer within a computer system which includes a plurality of bus masters connected through a common bus and the data buffer to a shared resource, such as memory. Assigned to each bus master is a unique arbitration value for prioritizing access to the shared resource. The method of the present invention comprises the steps of storing buffer configuration parameter data for each one of the bus masters within a register file, decoding the unique arbitration level for a bus master controlling the bus to retrieve parameter data associated with the controlling bus master from the register file, and configuring the buffer in accordance with the retrieved mode data.

The apparatus as described herein is employed within an interface between a Micro Channel bus and a system bus providing access to one or more memory modules. The apparatus includes a latch connected to receive four-bit arbitration signals from bus masters residing on the Micro Channel bus, a register file programmed with specific data buffer parameter information for each Micro Channel bus master, and logic for decoding arbitration levels to retrieve from the register file parameter data associated with a bus master having control of the Micro Channel bus. A data buffer included within the interface is optimally configured in accordance with the parameter data retrieved from the register file.

The above and other objects, features, and advantages of the present invention will become apparent from the following description and the attached drawings.

DETAILED DESCRIPTION OF THE PREFERRED EMBODIMENT

Figure 1:
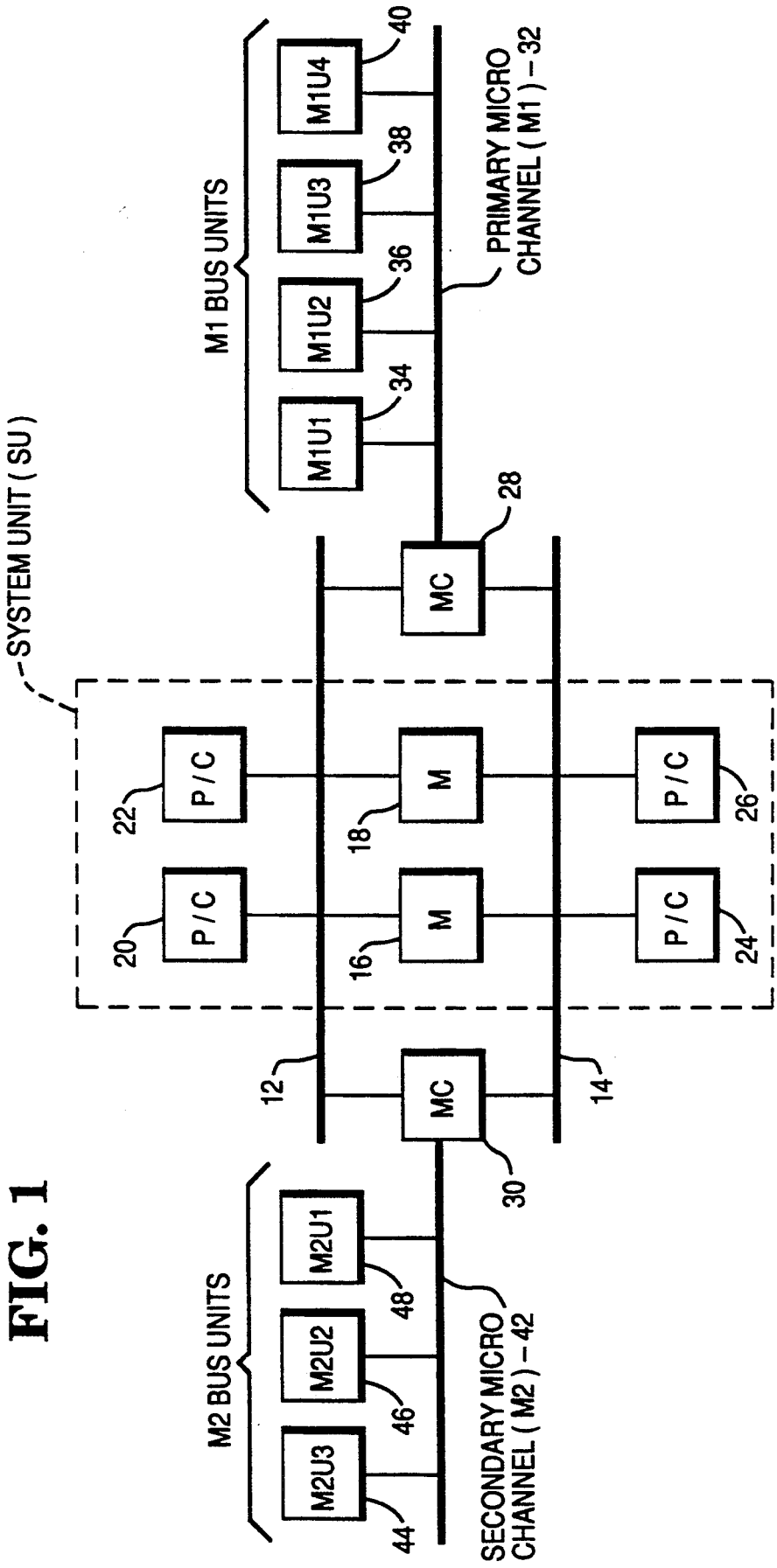
FIG. 1 is a block diagram representation of a scalable system architecture for a computer system.

One implementation of a scalable system architecture for a computer system is shown in the simple block diagram of FIG. 1. As implemented, the architecture comprises dual system busses 12 and 14, two dual-ported system memory modules 16 and 18 connected between the two system busses, two processor modules 20 and 22 connected to bus 12, and two processor modules 24 and 26 connected to system bus 16. Also connected between the system busses are Micro Channel ® interface modules 28 and 30.

Micro Channel interface module 28 provides connection between system busses 12 and 14 and primary Micro Channel I/O bus 32. Connected to bus 32 are various Micro Channel bus masters 34, 36, 38 and 40. Interface module 30 provides connection between system busses 12 and 14 and bus masters 34, 36, 38 residing on secondary Micro Channel I/O bus 32.

Figure 2A:
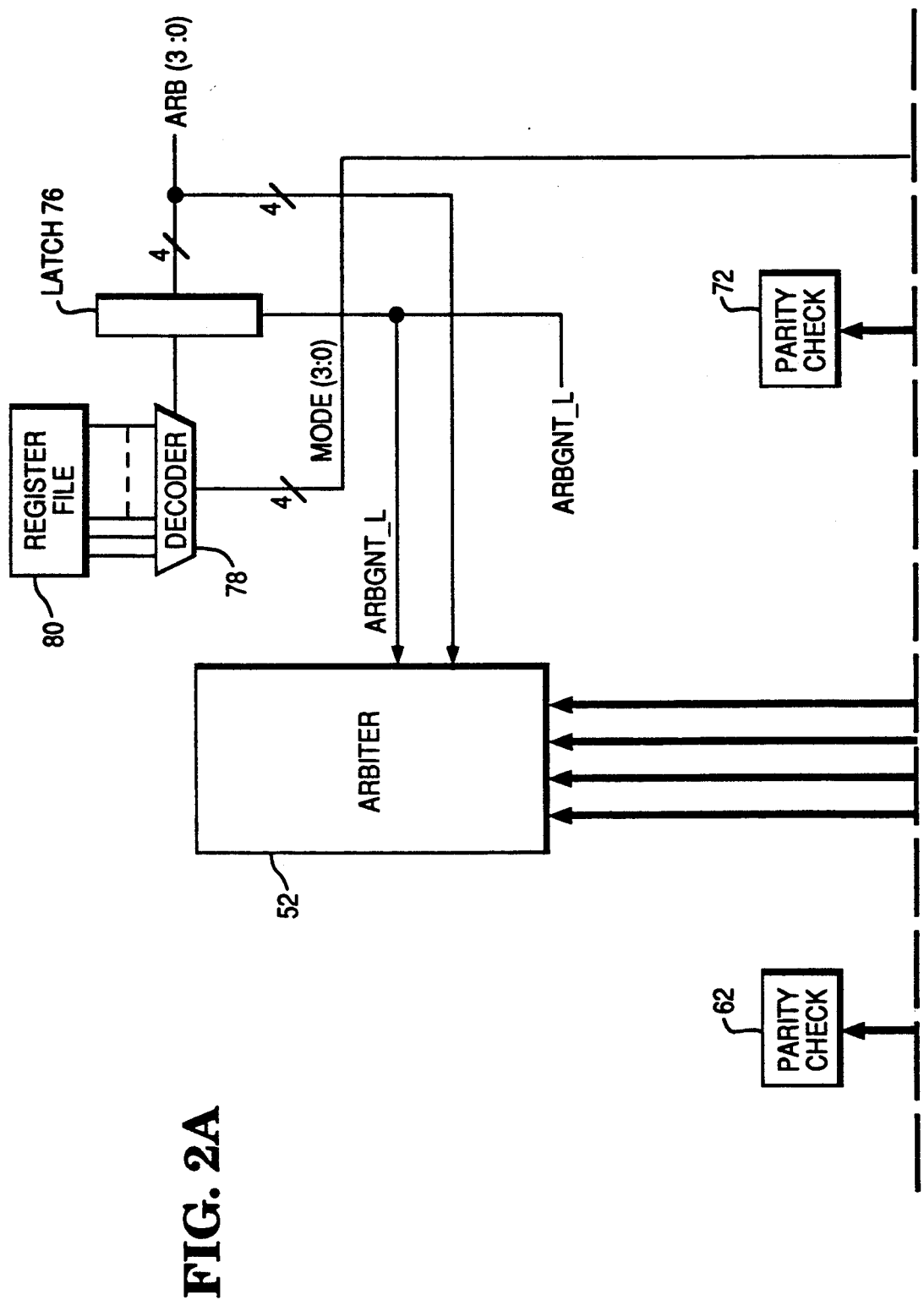
FIGS. 2A and 2B provide a block diagram representation of the addressing and arbitration logic included within Micro Channel interface module 28 of FIG. 1, including buffer control logic in accordance with the present invention.
Figure 2B:
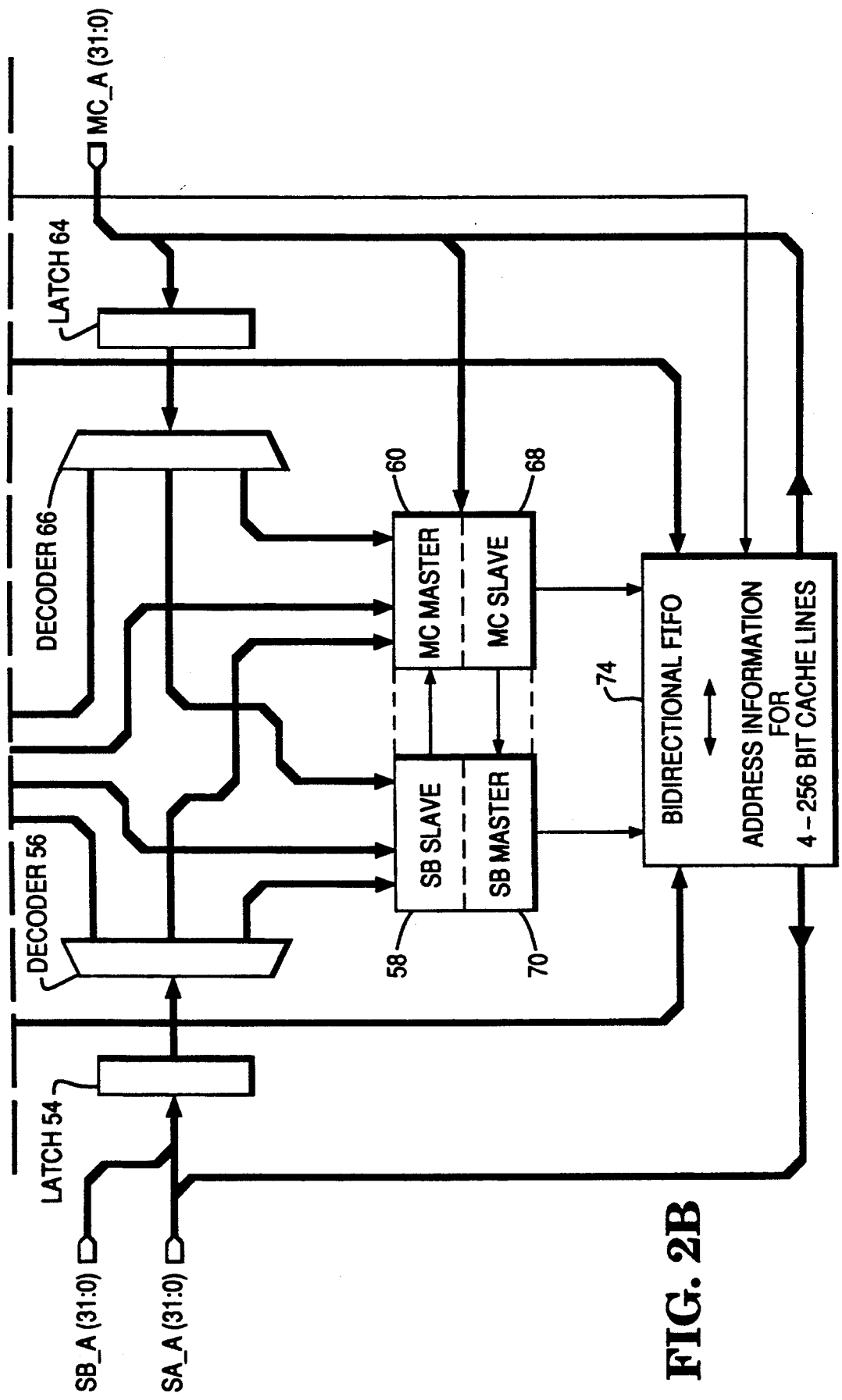

A block diagram representation of the addressing and arbitration logic included within Micro Channel (MC) interface module 28 is shown in FIGS. 2A and 2B. The interface module includes logic in addition to what is shown in FIG. 2 which has been omitted to simplify the present discussion. The omitted logic is not necessary for an understanding of the present invention.

The logic blocks shown in FIG. 2 include an arbiter 52 which senses and drives MC I/O bus 32 arbitration signals ARB(3:0) and arbitration/grant indicator signal ARBGNT_L. The arbiter must arbitrate for control of I/O bus 32 during system bus initiated requests for access to the I/O bus. Arbiter 52 also conducts system bus arbitration and cycle generation on behalf of MC bus masters requesting access to system resources.

Logic elements utilized during system bus initiated cycles propagated to the MC I/O bus include latch 54 which is used to latch address, address parity and bus operation signals received from system bus 12, i.e. signals SB_A(31:0), or system bus 14, i.e. signals SB_B(31:0). The output of latch 54 is provided to a decoder 56 which detects whether or not the current cycle is directed to the MC I/O bus and generates start and decoded address signals for system bus slave module 58.

System bus slave module 58 controls the multiplexing of system bus address information to I/O bus 32, coordinates system bus data transfer activities, and controls the starting of MC bus master module 60. Upon receiving a start signal from module 58, MC bus master module 60 generates cycles on MC I/O bus 32 in accordance with the Micro Channel Architecture specification and coordinates MC I/O bus data transfer activities.

Logic elements utilized during MC I/O bus initiated cycles propagated to the system bus include latch 64, decoder 66, MC slave module 68, SB master module 70, and address FIFO 74. When MC interface module 28 is a slave on MC I/O bus 32, MC address MC_A(31:0) is held within latch 64 to be propagated to decoder 66. Decoder 66 is responsible for decoding of MC cycles directed to the system busses and determining whether the system bus directed cycles are to be decoupled to allow write posting and read-ahead address information into address FIFO 74.

MC bus slave module 68 senses the MC bus signals received from decoder 66 to latch the current address, initiate propagation of the MC cycle to a selected system bus and coordinate MC I/O bus data transfer activity.

The system bus master module requests a system bus on behalf of a MC bus master and controls the system signals when MC interface module 28 is a system bus master on either one of system busses 12 or 14. System bus master module 70 communicates with address FIFO 74 and coordinates system bus transfer activities.

Figure 3:
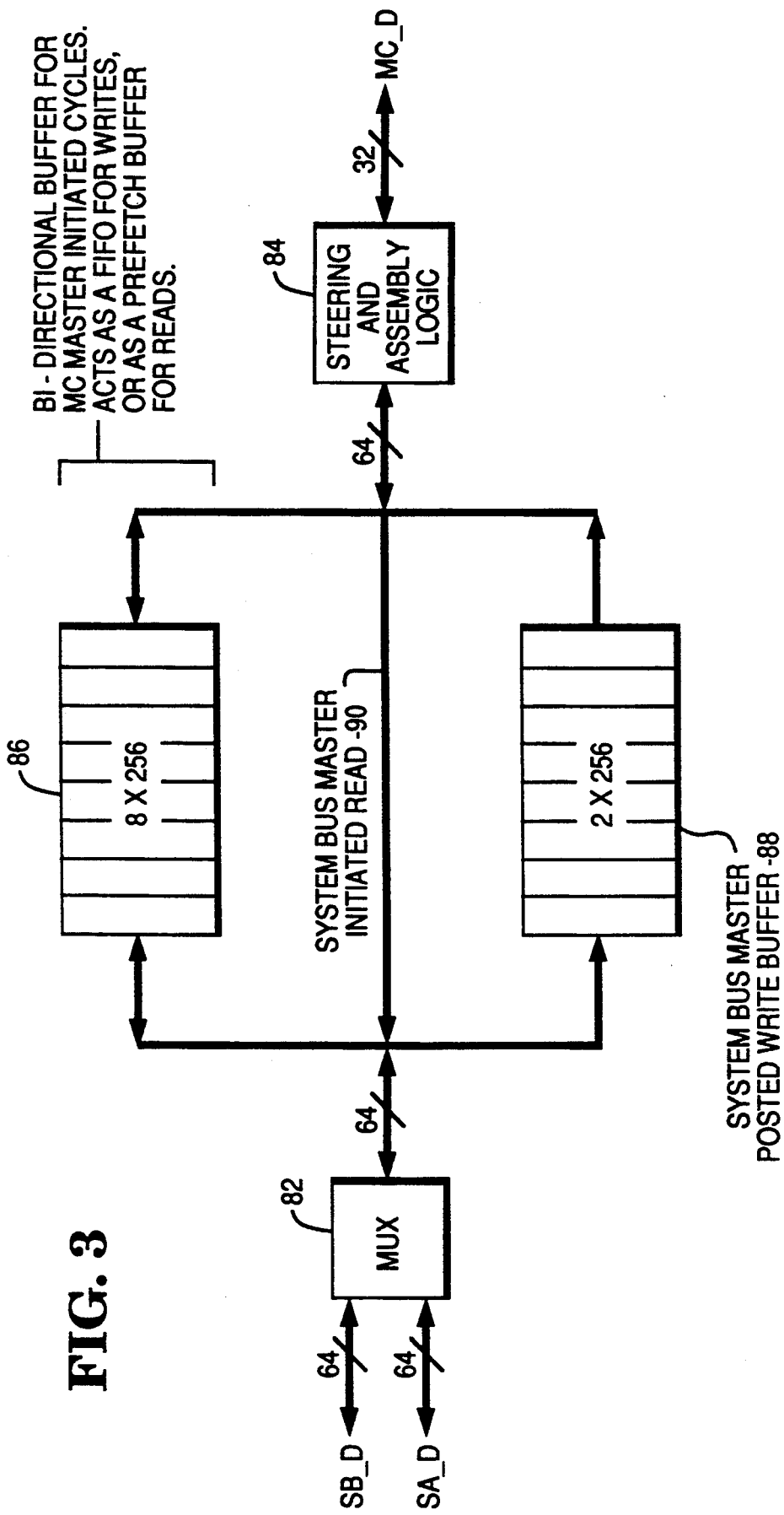
FIG. 3 is a simplified depiction of the data path structure included within Micro Channel interface module 28 of FIG. 1.

The data path structure included within Micro Channel interface module 28 is shown in FIG. 3. The structure includes a multiplexer 82 and steering logic 84 for directing data transfers between either system data bus and the MC bus. System bus data is identified as SA_D and SB_D. Micro Channel bus data is identified as MC_D. Three data paths are provided by the architecture. For MC bus master initiated cycles, data is directed through a bidirectional buffer 86. During system bus master initiated write cycles data is provided from the selected system bus through a write-posting buffer 88 to the MC bus. Data is provided directly from the MC bus to the selected system bus via path 90 during system bus master initiated read cycles.

Interface module 28 provides buffering, or decoupling, between the system busses and the I/O bus 32. Data buffering at the interface module boosts total system bandwidth by allowing bus masters on both the system busses and I/O bus 32 to concurrently operate at their peak rates.

When a bus master on I/O bus 32 requires write access to system memory, it first must arbitrate for control of bus 32. Upon gaining control of the bus 32, the bus master transfers its data into bidirectional buffer 86 which functions as an eight 256-bit line FIFO line buffer. After filling one of the eight line buffers, MC I/O module 28 arbitrates for control of either one of the system busses and performs a burst cycle to move the buffer contents to system memory. Meanwhile, the master continues to write new data into the next line buffer.

During MC bus master reads from system memory buffer 86 functions as a read-ahead pre-fetch queue for the MC bus master. An MC bus master read cycle will cause the MC interface module to arbitrate for the system bus and fill buffer 86 with read data. The requested data is fed to the MC bus master as fast as possible while the buffer is filled.

The present invention provides a method and means for decoding MC arbitration signals to configure data buffer 86 for the most efficient operation with each bus master on the Micro Channel bus. The block diagram of FIG. 2A includes a latch 76, decoder 78 and register file 80 for performing this function. Latch 76 is connected to receive the Micro Channel arbitration signals ARB(3:0) and arbitration/grant signal ARBGNT_L from the Micro Channel bus. Signals ARB(3:0) are latched and held when signal ARBGNT_L is set to the grant, or LOW, state. Decoder 78 is connected to receive the output of latch 76 and retrieve from register file 80 stored data utilized to properly configure the data buffer. The retrieved data signals, identified as MODE(3:0), are provided to address FIFO 74 which coordinates the data transfer operation.

Arbitration signals ARB(3:0) are driven by bus masters residing on the Micro Channel bus when requesting ownership of the MC bus. Up to sixteen arbitration levels, binary values 0000 through 1111, are supported. The highest priority value for ARB(3:0) is binary 0000, the lowest is binary 1111.

ARBGNT_L is set to the arbitration, or HIGH, state at the initiation of an arbitration cycle. Requesting bus masters then drive their 4-bit arbitration level onto the arbitration bus. When a requesting bus master sees a more-significant bit LOW on the arbitration bus, it stops driving its less-significant bits onto the arbitration bus. The bus master driving the lowest arbitration level, i.e. the highest priority value, thereby wins control of the bus. ARBGNT_L is set LOW at the conclusion of the arbitration cycle. However, the arbitration level associated with the winning bus master remains on the arbitration bus.

It is this arbitration level remaining on the arbitration bus at the conclusion of the arbitration cycle which is utilized to optimally configure the data buffers. Because each MC bus master must have a different arbitration level assigned thereto, the ARB(3:0) signals uniquely identify the various bus masters. For each arbitration level, register file 80 is programmed with a mode value, MODE(3:0), that selects the optimal set of data buffer parameters for the bus master associated with the arbitration level. Thereafter in normal operation, when a particular bus master wins control of the bus, its arbitration level selects the appropriate entry in register file 80 to dynamically configure the logic controlling the data buffers.

Table 1, shown below, presents one possible scheme for utilizing register file 80 to specify the read-ahead policy for each MC arbitration level when MC interface module 28 is a slave to a MC bus master reading from system memory.

TABLE 1

| MODE 3 | MODE 2 | MODE 1 | MODE 0 | DEFINITION |
|---|---|---|---|---|
| 1 | 0 | 0 | 0 | 16 Bytes |
| 1 | 0 | 0 | 1 | 32 Bytes |
| 1 | 0 | 1 | 0 | 48 Bytes |
| 1 | 0 | 1 | 1 | 64 Bytes |
| 1 | 1 | 0 | 0 | 80 Bytes |
| 1 | 1 | 0 | 1 | 96 Bytes |
| 1 | 1 | 1 | 0 | 112 Bytes |
| 1 | 1 | 1 | 1 | 128 Bytes |
| 0 | X | X | X | One Bus Word |

In Table 1, mode bits 2, 1 and 0 specify the amount of data in multiples of full memory lines prefetched from main memory in response to a MC bus master read. Mode bit 3 enables and disables prefetching of data in excess of one bus word. Additional mode values may enable buffering of data being written from the MC bus master to system memory or enable 32-bit or 64-bit streaming for MC bus master initiated read and write operations.

It can thus be seen that there has been provided by the present invention a simple method and logic for optimizing memory read and write transfers between a plurality of bus masters and a shared memory resource. The invention when implemented with bus masters residing on a Micro Channel bus decodes standard four-bit arbitration values and the arbitration/grant signal defined by the Micro Channel architecture standards to identify the bus master controlling the bus and configure a data buffer connected between the Micro Channel bus and the shared memory resource in accordance with prestored configuration parameters associated with the controlling bus master.

Although the presently preferred embodiment of the invention has been described, it will be understood that various changes may be made within the scope of the appended claims.

What is claimed is:

1. In a computer system including a plurality of bus masters connected through a common bus to a shared resource, and a data buffer interposed between said common bus and said shared resource, each one of said plurality of bus masters having a unique arbitration value associated therewith for prioritizing access to said shared resource through an arbitration process, the operation of said data buffer capable of being configured in accordance with different buffer configuration parameters, a method for optimizing data transmissions between said bus masters and said shared resource, comprising the steps of:

storing buffer configuration parameters for each one of said plurality of bus masters within a register file, said buffer configuration parameters defining the optimal mode of buffer operation during data transmissions between each one of said plurality of bus masters and said shared resource;

determining the arbitration value associated with the bus master granted access to said shared resource upon conclusion of said arbitration process;

determining the bus master granted access to said shared resource by decoding the arbitration value associated with the bus master granted access to said shared resource:

retrieving the buffer configuration parameters associated with said bus master granted access to said shared resource from said register file; and configuring said buffer to operate in accordance with said retrieved buffer configuration parameters.

2. The method according to claim 1, wherein:

said common bus comprises Micro Channel address, data and arbitration busses and control lines; and said arbitration values comprise four-bit Micro Channel arbitration values.

3. The method according to claim 2, wherein:

said shared resource comprises a memory device capable of supporting streaming data transfers;

said data buffer can be configured to process streaming data transfers; and said step of configuring said data buffer includes the step of enabling said data buffer to perform streaming data transfers between said memory device and the bus master controlling said common bus via said data buffer.

4. The method according to claim 1, wherein:

said shared resource comprises a memory device;

said data buffer can be configured to prefetch data from said memory device during bus master read operations; and said step of configuring said data buffer includes the step of enabling said data buffer to prefetch data from said memory device during bus master read operations.

5. The method according to claim 4, wherein:

said step of configuring said data buffer includes the step of specifying the amount of data to be prefetched to said data buffer during bus master read operations.

6. The method according to claim 1, wherein:

said data buffer can be configured to buffer data written to said shared resource during bus master write operations; and said step of configuring said data buffer includes the step of enabling said data buffer to buffer data written to said shared resource during bus master write operations.

7. A method for transferring data between one of a plurality of bus masters and a shared resource, each one of said plurality of bus masters being connected through a common bus and a data buffer to said shared resource and having a unique arbitration value associated therewith for prioritizing access to said common bus, through an arbitration process, comprising the steps of:

determining the arbitration value associated with the bus master granted control of said common bus upon conclusion of said arbitration process;

determining the bus master granted control of said common bus by decoding the arbitration value associated with the bus master granted control of said common bus; and configuring said data buffer for use with the bus master granted control of said common bus.

8. In a computer system including a plurality of bus masters connected through a common bus to a shared resource, and a data buffer interposed between said common bus and said shared resource, each one of said plurality of bus masters having a unique arbitration value associated therewith for prioritizing access to said shared resource through an arbitration process, the operation of said data buffer capable of being configured in accordance with different buffer configuration parameters, apparatus for optimizing data transmissions between said bus masters and said shared resource, the apparatus comprising:

a register file for storing buffer configuration parameters for each one of said plurality of bus masters, said buffer configuration parameters defining the optimal mode of buffer operation during data transfers between each one of said plurality of bus masters and said shared resource;

means for determining the arbitration value associated with the bus master granted access to said shared resource upon conclusion of said arbitration process;

means for determining the bus master granted access to said shared resource by decoding the arbitration value associated with the bus master granted access to said shared resource; and means connected to said register file for retrieving the buffer configuration parameters associated with said bus master granted access to said shared resource from said register file;

means connected to receive said retrieved buffer configuration parameters and connected to said data buffer for configuring said buffer to operate in accordance with said retrieved buffer configuration parameters.

9. The apparatus according to claim 8, wherein:
said common bus comprises Micro Channel address, data and arbitration busses and control lines; and
said arbitration values comprise four-bit Micro Channel arbitration values.

10. The apparatus according to claim 9, wherein:
said means for determining includes a latch connected between said Micro Channel arbitration bus and said means for decoding the arbitration value associated with the bus master granted access to said shared resource and connected to receive the Micro Channel arbitration/grant control signal, said latch being responsive to said arbitration/grant signal to latch the arbitration value placed on said arbitration bus when said arbitration/grant signal goes to the grant state.

11. The apparatus according to claim 8, wherein:
said shared resource comprises a memory device.

12. The apparatus according to claim 11, wherein:
said buffer configuration parameters include parameters which define buffer operations for data transmissions from the bus master granted access to said memory device to said memory device.

13. The apparatus according to claim 11, wherein:
said buffer configuration parameters include parameters which define buffer operations for prefetching of data from said memory device to said data buffer granted access to said memory device.

14. The apparatus according to claim 13, wherein:
said buffer configuration parameters define the amount of data to be prefetched to said data buffer during bus master read operations.

15. The apparatus according to claim 8, wherein:
said shared resource comprises a memory device; and
said buffer configuration parameters include parameters which define buffer operations for streaming data transfers between said memory device and the bus master granted access to said memory device.

16. An interface circuit connected between a plurality of bus masters and a shared resource for optimizing data transmissions between said bus masters and said shared resource, each one of said plurality of bus masters being connected through a common bus to said interface circuit and having a unique arbitration value associated therewith for prioritizing access to said common bus through an arbitration process, said interface circuit comprising:

a variable configuration data buffer interposed between said common bus and said shared resource; and buffer control logic connected to receive the arbitration value associated with a bus master granted control of said bus upon the conclusion of said bus arbitration process and responsive thereto to configure said data buffer to buffer data transmissions between said controlling bus master and said shared resource.

* * * * *